United States Patent [19]
Yamaguchi

[11] Patent Number: 4,881,628
[45] Date of Patent: Nov. 21, 1989

[54] AUTOMATIC TRANSMISSION HAVING COAXIALLY OVERLAPPED CLUTCHES

[75] Inventor: Toshio Yamaguchi, Hatano, Japan

[73] Assignee: Nissan Motor Co., Ltd., Yokohama, Japan

[21] Appl. No.: 143,413

[22] Filed: Jan. 13, 1988

[30] Foreign Application Priority Data

Jan. 17, 1987 [JP] Japan ................................. 62-8841

[51] Int. Cl.⁴ ...................... F16D 55/10; F16D 25/06
[52] U.S. Cl. ........................... 192/85 AA; 192/87.11; 192/87.15
[58] Field of Search ............. 192/85 AA, 87.11, 87.15

[56] References Cited

U.S. PATENT DOCUMENTS

| | | | |
|---|---|---|---|
| 3,554,057 | 1/1971 | Michnay et al. | 192/87.11 |
| 3,596,537 | 8/1971 | Koivunen | 192/85 AA |
| 3,710,650 | 1/1973 | Piret | 192/87.11 |
| 3,744,605 | 1/1973 | Piret | 192/85 AA |
| 3,744,606 | 7/1973 | Bucksch | 192/87.11 |
| 3,747,727 | 7/1973 | Dach et al. | 192/87.11 |
| 3,765,519 | 10/1973 | Kell | 192/85 AA |
| 4,010,833 | 3/1977 | Brandel et al. | 192/87.11 |
| 4,082,171 | 4/1978 | Lanlin et al. | 192/87.11 |
| 4,732,253 | 3/1988 | Hiramatsu et al. | 192/87.11 |
| 4,741,422 | 5/1988 | Fuehrer et al. | 192/87.11 |

FOREIGN PATENT DOCUMENTS 55-40367 3/1980 Japan.
62-4930 1/1987 Japan ............................ 192/85 AA Primary Examiner—Leslie A. Braun
Assistant Examiner—Andrea Pitts
Attorney, Agent, or Firm—Foley & Lardner, Schwartz, Jeffery, Schwaab, Mack, Blumenthal & Evans

[57] ABSTRACT

Herein disclosed is an automatic transmission which comprises a first clutch including a first drum with a closed bottom portion, and a first piston axially slidably received in the first drum to define a piston working fluid chamber in the first drum between the first piston and the closed bottom portion, the first piston having a cylindrical outer wall portion which extends away from the closed bottom portion of the first drum; a second clutch including a second drum coaxially received in the first drum in a manner to define between a cylindrical inner surface of the first drum and a cylindrical outer surface of the second drum a cylindrical clearance; a clutch plate unit including drive and driven plates which are juxaposed, the clutch plate unit being arranged within the cylindrical clearance and compressed by a leading end of the cylindrical outer wall portion of the first piston upon application of fluid pressure to the piston working fluid chamber; and a biasing structure for biasing the first piston away from the clutch plate unit, the biasing structure being installed within the cylindrical clearance.

10 Claims, 2 Drawing Sheets

AUTOMATIC TRANSMISSION HAVING COAXIALLY OVERLAPPED CLUTCHES

BACKGROUND OF THE INVENTION

1. Field of the Invention

The present invention relates in general to a clutch structure installed with an automatic transmission, and more particularly to a clutch structure employed in automotive automatic transmissions of a type which has two clutches coaxially overlapped.

2. Description of the Prior Art

In an automatic transmission, there are installed various frictionally engaging elements, such as clutches, brakes and the like, which constitute part of a gear train of the transmission. Under operation of the transmission, for achieving gear changes, such elements are controlled in ON-OFF (viz., engaged-disengaged) manner by fluid pressures produced through control valves in accordance with the running condition of a motor vehicle.

Among the conventional automatic transmissions hitherto proposed and put into practical use, there is a type in which two clutches are coaxially overlapped for the purpose of reducing the size, viz., the axial length, of the transmission. Japanese Patent First Provisional Publication No. 55-40367 shows one of the transmissions of such type, in which a clutch drum of a high clutch is coaxially received in a clutch drum of a reverse clutch.

In the transmission of the publication, a piston of the reverse clutch is coaxially received in the clutch drum of the same in a manner to face the under surface of the clutch drum of the high clutch. Drive and driven clutch plates are juxtaposed within a cylindrical clearance defined between the inner and outer surfaces of the respective clutch drums of the reverse and high clutches, and, upon application of fluid pressure to a piston working fluid chamber, these plates are compressed by the piston thereby to achieve engagement between these two clutch drums. A plurality of return springs are arranged to lie about a cylindrical inner wall portion of the piston of the reverse clutch in a space defined between the piston and the under surface of the clutch drum of the high clutch. One end of each return spring is pressed on the piston. An annular spring retainer for retaining the other end of each return spring is securely mounted to a fixed shaft portion along which the piston moves.

However, because of provision of the return springs and the spring retainer at such a position as described hereinabove, the axial length of the space is remained considerable even when the piston comes closest to the under surface of the clutch drum of the high clutch. That is, it is inevitably necessary to increase the axial length of the space to a degree greater than the stroke of the piston. This necessity causes the combined structure of the two clutch drums to have a considerable axial length irrespective of employment of the overlapped clutch arrangement.

SUMMARY OF THE INVENTION

It is therefore an object of the present invention to provide an overlapped clutch structure of an automatic transmission, which structure is reduced in size, particularly in axial length thereof.

According to the present invention, there is provided an automatic transmission which comprises a first clutch including a first drum with a closed bottom portion, and a first piston axially slidably received in the first drum to define a piston working fluid chamber in the first drum between the first piston and the closed bottom portion, the first piston having a cylindrical outer wall portion which extends away from the closed bottom portion of the first drum; a second clutch including a second drum coaxially received in the first drum in a manner to define between a cylindrical inner surface of the first drum and a cylindrical outer surface of the second drum a cylindrical clearance; a clutch plate unit including drive and driven plates which are juxtaposed, the clutch plate unit being arranged within the cylindrical clearance and compressed by a leading end of the cylindrical outer wall portion of the first piston upon application of fluid pressure to the piston working fluid chamber; and a biasing structure for biasing the first piston away from the clutch plate unit, the biasing structure being installed within the cylindrical clearance.

DETAILED DESCRIPTION OF THE PREFERRED EMBODIMENTS

Figure 1:
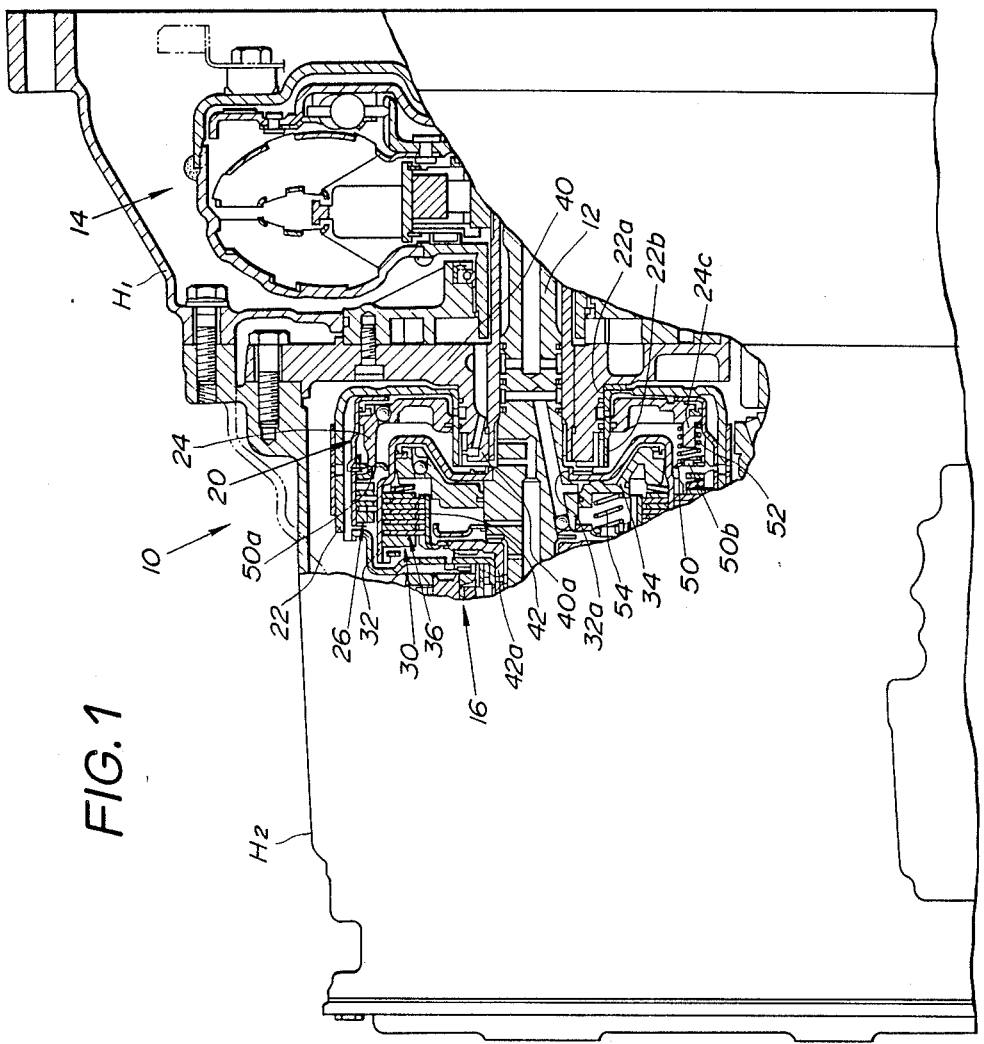
FIG. 1 is a partially sectional view of an automatic transmission, showing an overlapped clutch structure according to the present invention.

Referring to FIG. 1, there is shown an automatic transmission 10 which installs therein an overlapped clutch structure according to the present invention.

Designated by numeral 12 is an input shaft to which an output of an engine (not shown) is applied through a torque converter 14. An output shaft (not shown) is arranged at a left side in the drawing to be coaxial with the input shaft 12, and a gear train 16 is arranged between the input shaft 12 and the output shaft.

Although not well shown in the drawing, the gear train 16 comprises a plurality of planetary gear units and frictionally engaging elements, such as hydraulically actuated clutches and brakes. By selectively engaging and disengaging the frictional elements, the geared condition of each planetary gear unit is changed thereby to achieve gear changes of the transmission.

The transmission 10 shown in the drawing is equipped with a reverse clutch 20 (viz., first clutch) and a high clutch 30 (viz., second clutch) which are coaxially overlapped in the illustrated manner. Each of the reverse and high clutches 20 and 30 comprises a clutch drum 22 or 32, a piston 24 or 34 and clutch plate units 26 or 36 each including juxtaposed drive and driven plates. The clutch drum 22 of the reverse clutch 20 is arranged to have its bottom portion protruded toward the torque converter 14. The clutch drum 22 is rotatably disposed at its center tubular portion 22a about a hollow boss portion 40a which is formed on a partition wall member 40 (or pump cover). As shown, the partition wall member 40 is arranged between a torque converter housing $H_1$ and a mission housing $H_2$. The center tubular portion 22a of the clutch drum 22 extends leftward, as viewed in the drawing, beyond the boss portion 40a of the partition wall member 40 to provide a shaft portion 22b which is used for guiding the piston 24. The piston 24 is formed with an annular closed end at its right side and axially slidably received in an annular bore which is defined between a cylindrical inner surface of the clutch drum 22 and a cylindrical outer surface of the shaft portion 22b.

Similar to the clutch drum 22 as mentioned hereinabove, the clutch drum 32 of the high clutch 30 is arranged to have its bottom portion protruded toward the torque converter 14. The bottom portion of the clutch drum 32 is securedly disposed at its center opening 32a on the input shaft 12, so that the input shaft 12 and the clutch drum 32 rotate together. The piston 34 of the high clutch 30 is annular shaped and is axially slidably received in an annular bore which is defined between a cylindrical inner surface of the clutch drum 32 and a cylindrical outer surface of the input shaft 12.

As shown in FIG. 1, the clutch drum 32 for the high clutch 30 is coaxially received in the clutch drum 22 for the reverse clutch 20, so that these two clutch drums are coaxially overlapped. Within an annular clearance between the cylindrical inner surface of the clutch drum 22 and the cylindrical outer surface of the other clutch drum 32, there is arranged the clutch plate unit 26 which can be pressed by an outer cylindrical wall portion of the piston 24 upon movement of the piston toward the unit 26. Designated by numeral 42 is a drum which is coaxially received in the clutch drum 32 of the high clutch 30 and secured to a pinion carrier 42a of one of the planetary gear units (not shown). The clutch plate unit 36 of the high clutch 30 is arranged within an annular clearance which is defined between the cylindrical inner surface of the clutch drum 32 and the cylindrical outer surface of the clutch drum 42. The clutch plate unit 36 can be operatively compressed by the piston 34 when the piston is moved toward the unit 36.

In accordance with the present invention, the following measure is applied to the overlapped clutch structure.

Figure 2:
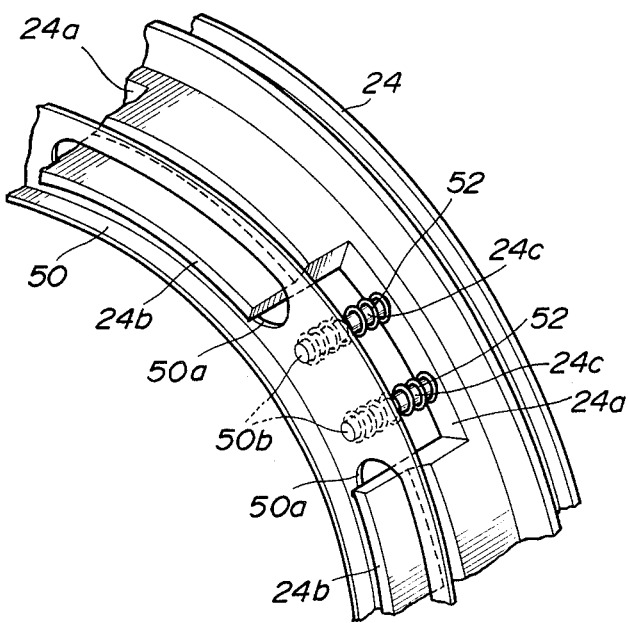
FIG. 2 is an enlarged perspective view of an essential part of the overlapped clutch structure of the present invention.

That is, as is seen from the drawings, especially from FIG. 2, an annular spring retainer 50 is fixed at its outer flanged portion to the cylindrical inner surface of the clutch drum 22 in a manner to be coaxial with the clutch drum 22. As will be described in detail hereinafter, a plurality of coil springs or return springs 52 are compressed between the annular spring retainer 50 and the clutch drum 22 in order to bias the piston 24 rightward in FIG. 1.

As is best shown in FIG. 2, the outer cylindrical wall portion of the piston 24 is formed with a plurality of rectangular recesses 24a which are equally spaced, leaving therebetween rectangular projections 24b. The annular spring retainer 50 is formed with equally spaced slots 50a for receiving therein the rectangular projections 24b. It is thus to be noted that the clutch plate unit 26 is compressed by the leading edge of the rectangular projections 24b which protrudes from the slots 50a. As is seen from FIG. 2, two return springs 52 are received in each rectangular recess 24a having one end pressed on a bottom wall of the recess 24a and the other end pressed on a solid portion of the annular spring retainer 50. Both ends of each return spring 52 are held by studs 24c and 50b which are formed on the bottom of the rectangular recess 24a and the solid portion of the annular spring retainer 50, respectively.

When, with the arrangement as described hereinabove, fluid pressures are applied to the work chambers for the pistons 24 and 34 through control valves (not shown) in accordance with the running condition of the vehicle, the pistons 24 and 34 are moved leftward in FIG. 1 against the respective return springs 52 and 54 compressing the clutch plates units 26 and 36. With this, an engaged condition of each clutch plate unit is established.

When the fluid pressures are discharged from the piston working chambers, the pistons 24 and 34 are moved rightward due to the forces of the return springs 52 and 54 cancelling the engaged condition of the clutch plate units 26 and 36. The reverse clutch 20 becomes engaged when a reverse position is selected, and the high clutch 30 becomes engaged when third or fourth speed position is selected in the illustrated transmission 10.

In the following, advantages of the present invention will be described.

First, since the return springs 52 for the reverse clutch piston 24 are arranged between the cylindrical inner surface of the clutch drum 22 of the reverse clutch and the cylindrical outer surface of the clutch drum 32 of the high clutch 30 in a manner as is described hereinabove, the space between the piston 24 and the closed end of the high clutch drum 32 has no need for containing therein the return springs, unlike the case of the afore-mentioned conventional overlapped clutch structure. Thus, the size, viz., the axial length of the space can be determined by only considering the stroke of the piston 24, so that the axial length of the overlapped structure of the two clutch drums can be reduced to a considerable degree. Of course, this structure induces reduction in size, viz., axial length of the automatic transmission.

Although the embodiment is directed to an overlapped structure which comprises a reverse clutch and a high clutch, the measure of the present invention is also applicable to another overlapped structure so long as the structure comprises coaxially overlapped two clutch drums.

What is claimed is:
1. An automatic transmission comprising:
a first means including a first drum with a closed bottom portion, and a first piston axially slidably received in said first drum to define a piston working fluid chamber in said first drum between said first piston and said closed bottom portion, said fist piston having a cylindrical outer wall portion which extends coaxially away from said closed bottom portion of the first drum;
a second means including a second drum coaxially received in said first drum in a manner to define between a cylindrical inner surface of said first drum and a cylindrical outer surface of said second drum a cylindrical clearance;
a clutch plate unit including drive and driven plates which are juxtaposed, said clutch plate unit being arranged within said cylindrical clearance and being compressed by a leading end of the cylindrical outer wall portion of said first piston upon application of fluid pressure to said piston working fluid chamber;
an annular spring retainer fixed at its outer peripheral portion to said cylindrical inner surface of said first drum, said annular spring retainer being formed with spaced slots;
means providing said cylindrical outer wall portion of said first piston with alternately arranged recesses and projections, said projections passing through said spaced slots and projecting toward said clutch plate unit to actuate the same; and at least one return spring arranged in each of said recesses of the first piston having one end pressed on a bottom wall of the recess and the other end pressed on a solid portion of said annular spring retainer;

wherein said at least one return spring in each of said recesses and said projection lie in a common plane.

2. An automatic transmission as claimed in claim 1, in which said slots of the annular spring retainer are arranged therealong at equally spaced intervals.

3. An automatic transmission as claimed in claim 2, in which each recess and each projection of the cylindrical outer wall portion of said piston are rectangular in shape.

4. An automatic transmission as claimed in claim 3, in which one end of each return spring is held by a stud formed on the bottom portion of each recess and the other end of the same is held by a stud formed on said annular spring retainer.

5. An automatic transmission as claimed in claim 4, in which said annular spring retainer has at its outer peripheral portion an annular flange which is secured to said cylindrical inner surface of said first drum.

6. An automatic transmission comprising:
a first clutch including a first drum with a closed bottom portion, and a first piston axially slidably received in said first drum to define a piston working fluid chamber in said first drum between said first piston and said closed bottom portion, said fist piston having a cylindrical outer wall portion which extends away from said closed bottom portion of the first drum;
a second clutch including a second drum coaxially received in said first drum in a manner to define between a cylindrical inner surface of said first drum and a cylindrical outer surface of said second drum a cylindrical clearance;
a clutch plate unit including drive and driven plates which are juxtaposed, said clutch plate unit being arranged within said cylindrical clearance and being compressed by a leading end of the cylindrical outer wall portion of said first piston upon application of fluid pressure to said piston working fluid chamber;
an annular spring retainer fixed at its outer peripheral portion to said cylindrical inner surface of said first drum, said annular spring retainer being formed with equally spaced slots;
means providing said cylindrical outer wall portion of said first piston with alternately arranged recesses and projections, said projections passing through one of the slots of the retainer and projecting toward said clutch plate unit to actuate the same;
two coil springs arranged in each of said recesses of the first piston, each spring having one end pressed on a solid portion of the annular spring retainer, wherein said two coil springs in each of said recesses and said projections lie in a common plane.

7. An automatic transmission as claimed in claim 6, in which one end of each coil spring is held by a stud formed on the bottom portion of the recess and the other end of the same is held by another stud formed on the annular spring retainer.

8. An automatic transmission comprising:
a first clutch including a first drum with a closed bottom portion, and a first piston axially slidably received in said first drum to define a piston working fluid chamber in said first drum between said first piston and said closed bottom portion, said fist piston having a cylindrical outer wall portion which extends away from said closed bottom portion of the first drum;
a second clutch including a second drum coaxially received in said first drum in a manner to define between a cylindrical inner surface of said first drum and a cylindrical outer surface of said second drum a cylindrical clearance;
a clutch plate unit including drive and driven plates which are juxtaposed, said clutch plate unit being arranged within said cylindrical clearance and being compressed by a leading end of the cylindrical outer wall portion of said first piston upon application of fluid pressure to said piston working fluid chamber;
an annular spring retainer fixed at its outer peripheral portion to said cylindrical inner surface of said first drum, said annular spring retainer being formed with equally spaced slots;
means providing said cylindrical outer wall portion of said first piston with alternately arranged recesses and projections, each projection passing through one of the slots of the retainer and projecting toward said clutch plate unit to actuate the same; and
two coil springs arranged in each of said recesses of the first piston, each spring having one end pressed on a bottom portion of the recess and the other end pressed on a solid portion of the annular spring retainer, wherein the end of each coil spring is held by a stud formed on the bottom portion of the recess and the other end of the same held by another stud formed for the annular spring retainer.

9. An automatic transmission comprising:
a first clutch including a first drum with a closed bottom portion, and a first piston axially slidably received in said first drum to define a piston working fluid chamber in said first drum between said first piston and said closed bottom portion, said first piston having a cylindrical outer wall portion which extends coaxially away from said closed bottom portion of the first drum;
a second means including a second drum coaxially received in said first drum in a manner to define between a cylindrical inner surface of said first drum and a cylindrical outer surface of said second drum a cylindrical clearance;
a clutch plate unit including drive and driven plates which are juxtaposed, said clutch plate unit being arranged within said cylindrical clearance and being compressed by a leading end of the cylindrical outer wall portion of said first piston upon application of fluid pressure to said piston working fluid chamber;
an annular spring retainer fixed at its outer peripheral portion to said cylindrical inner surface of said first drum, said annular spring retainer being formed with spaced slots;
means providing said cylindrical outer wall portion of said first piston with alternately arranged recesses and projections, said projections passing through said spaced slots and projecting toward said clutch plate unit to actuate the same; and
at least one return spring arranged in each of said recesses of the first piston having one end pressed on a bottom wall of the recess and the other end pressed on a solid portion of said annular spring retainer; wherein said slots of the annular spring retainer are arranged there along at equally spaced intervals;

each recess and each projection of the cylindrical outer wall portion of said piston are rectangular in shape; and one end of each return spring is held by a stud formed on the bottom portion of each recess and the other end of the same is held by a stud formed on said annular spring retainer.

10. An automatic transmission as claimed in claim 9, in which said annular spring retainer has at its outer peripheral portion an annular flange which is secured to said cylindrical inner surface of said first drum.

* * * * *